Jan. 28, 1958 L. PIERCE ET AL 2,821,088
LIMIT SWITCH OPERATING MECHANISM
Filed Nov. 7, 1951 2 Sheets-Sheet 2

WITNESSES:
E.A. M?Closkey
New. Le Groome

INVENTORS
Lawrence Pierce, Ralph B. Immel
and Stanley Kmonk, Jr.
BY
Paul E. Friedemann
ATTORNEY United States Patent Office 2,821,088
Patented Jan. 28, 1958

2,821,088

LIMIT SWITCH OPERATING MECHANISM

Lawrence Pierce, Buffalo, and Ralph B. Immel, Williamsville, N. Y., and Stanley Kmonk, Jr., Pittsburgh, Pa., assignors to Westinghouse Electric Corporation, East Pittsburgh, Pa., a corporation of Pennsylvania Application November 7, 1951, Serial No. 255,252

8 Claims. (Cl. 74—99)

Our invention relates to switches and, more particularly to switch operating mechanisms, as applied to precision limit switches and similar other switch uses.

Limit switch operating mechanisms are well known in the prior art. Many limit switch uses, as for example in repetitive precision machining operations on a production line, require many operations per minute over long periods of time. The useful life, in terms of number of operations, for the prior art devices is rather limited.

In precision machining operations a variation in the product coming off a production line cannot be tolerated. The limit switches used must thus show substantially no wear over long periods of use.

It is an object of our invention to provide the trade with a reliable and dependable switch operating mechanism.

A more specific object of our invention is the provision of an operating mechanism, for a plunger actuated switch, for translating the rotary motion of a lever actuated by some machine, as a milling machine, into linear motion in a straight line perpendicular to the plane of the rotary motion of the lever.

A specific object of our invention is the provision of applying linear motion to the ends of a leaf spring disposed in slightly flexed position between two movable stops, with the motion at each end being toward the middle of the spring to thus cause the middle of the spring to move in a straight line normal to the plane of the spring.

A further object of our invention is the provision, in the mechanical structure of a limit switch, or similar device, of an elongated leaf spring disposed in slightly bowed condition between two movable stops in use operable by equal amounts toward each other to thus produce a highly amplified mechanical movement, at the middle of the leaf spring, normal to the spring axis.

The objects stated are merely illustrative. Still other objects and advantages will become more apparent from a study of the following specification and the accompanying drawings, in which:

Fig. 6 is a sectional view of a detail on section line VI—VI of Fig. 1.

Figure 1:
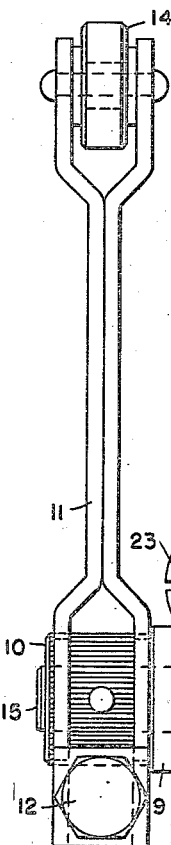
Figure 1 is a vertical section through the housing showing a side of our invention the section being substantially on the section line I—I of Fig. 2, looking in the direction indicated by the arrows at the ends of the section line.

From the showing in Fig. 1, it will be apparent that the base 1 consists of a front or cover portion 2 and the rear portion 3. The rear portion houses the switch 4. This switch 4 is a plunger or push button actuated type with the plunger or push button 5 projecting from the switch casing and the switch operates with a snap action upon axial movement of the plunger 5 through a selected distance.

The switch 4 is rigidly mounted on the cover 2 by means of the bolts 6 and 7 as shown.

The operating mechanism includes a bronze bearing bushing 8 rigidly cast into the die-cast cover 2. This bushing 8, as seen in Fig. 1, is provided with the enlargement 9 at the left, against which the split serrated sleeve 10 operates as a thrust bearing. The sleeve 10 is provided with serrations on its outer surface to receive the operating lever 11.

The operating lever is provided with the lower bifurcations, which are designed to receive the bolt 12. By circumferentially adjusting the operating lever on sleeve 10 and tightening the nut 13, the lever may be rigidly secured to the sleeve 10 in any desired angular position. The lever 11 carries the roller 14; which roller is in use disposed to be actuated by some dog on a machine for effecting some machining operation on a workpiece.

The sleeve 10 is rigidly secured to the shaft 15, disposed within the bearing sleeve 8. The right-hand end of the shaft projects a short distance beyond the right-hand end of the bearing sleeve 8, and a cup-shaped cam member 16 is rigidly secured to the right-hand end of the shaft. The assembly is such that the parts fit snugly but nevertheless permit free rotation of the shaft. The disposition of the parts is such that the wall of the cup-shaped cam member fits over the right-hand end of the bearing sleeve 8.

The base of the cup-shaped member is provided with the cam 17 and the wall is provided with a spring actuating projection 18, disposed between the legs 19 and 20 of the generally U-shaped spring 21 mounted on the outer right-hand surface of the bearing sleeve 8.

An adjustable stop mechanism 22 is also mounted on the bearing sleeve adjacent the inner wall of the cover 2 and is held in fixed relation on the cover by the bolt 23.

The stop mechanism 22 is provided with the stops 24, 25 and 26. The stop 25 has a dove-tailed end and is disposed between the legs 19 and 20 of the spring 21 and thus prevents rotation of the spring 21 on the sleeve bearing 8 upon angular movement of the stop 18 by the angular movement of shaft 15.

Figure 2:
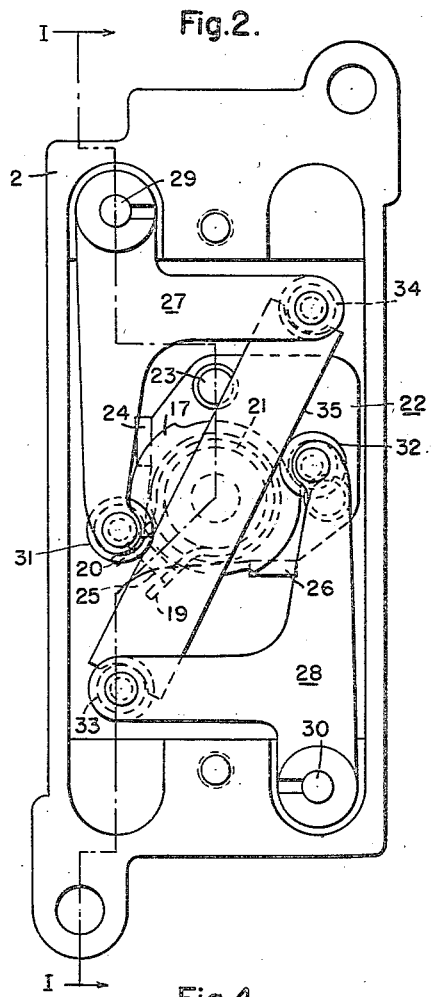
Fig. 2 is a sectional view, along line II—II of Fig. 1 looking in the direction indicated.
Figure 3:
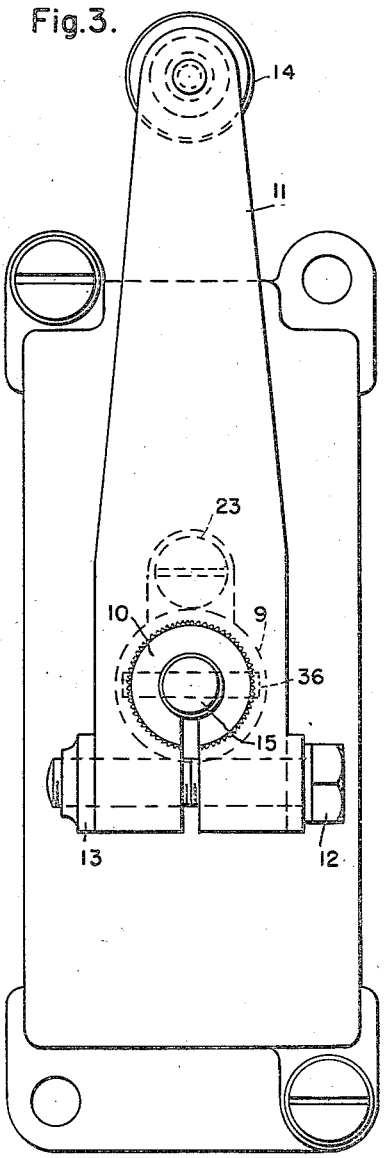
Fig. 3 is a front view of our device.
Figure 4:
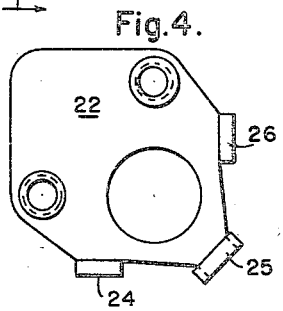
Figs. 4 and 5 are showings of certain details of the apparatus included in our device.
Figure 5:
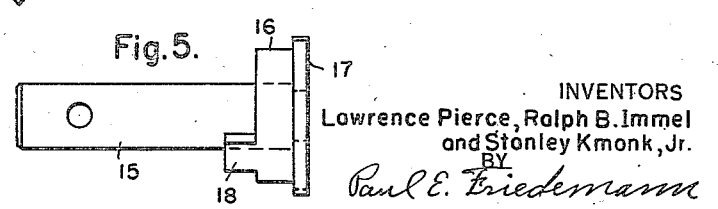

A pair of bell-crank levers 27 and 28, identical in design, are pivoted on suitable bearing pins 29 and 30 cast into the cover 2. The vertical arms of the bell-crank levers are provided with the rollers 31 and 32, respectively, disposed to engage the cams as shown in Figs. 2 and 6. The horizontal arms of the bell-crank levers carry the bearing members 33 and 34, respectively. The members 33 and 34 provide flat-bottomed V-shaped bearings for receiving the ends of the leaf spring 35. The spring 35 is inserted under end thrust to thus be clipped between these rollers 33 and 34 in bowed position. By bowing the spring 35 as shown, movement of the members 33 and 34 toward each other will effect movement of the middle of the spring only in one direction, namely toward the right as seen in Fig. 1, and the spring 35 actuates the bell-crank levers counterclockwise to thus assure that the rollers 31 and 32 are always in firm contact with the cam 17.

When the operating lever 11 is actuated to rotate the shaft 15 counterclockwise as seen in Fig. 2, the cams 17 ride on the rollers 31 and 32, moving the bell-crank levers clockwise by an equal amount. This movement takes place against the action of spring 21, because the projection 18 moves the leg 19 counterclockwise whereas the stop 25 holds the other leg 20 in the position shown.

The clockwise movement of the bell-crank levers by an equal amount causes the bearing member 34 to move toward the axis of plunger 5 by exactly the same amount that the bearing member 33 moves toward the axis of plunger 5. The middle of the spring 35 will thus move in a straight line perpendicular to the spring axis, namely move along the axis of plunger 5 to actuate the snap switch 4.

The apparatus described and shown, in addition to providing a simple operating mechanism for the switch 4, the leaf spring 35 provides considerable movement amplification. A slight decrease in the distance between the hardened V-groove bearings in the members 33 and 34 results in a relatively large deflection of the middle of the leaf spring 35 perpendicular to its axis. With hardened V-shaped bearings in members 33 and 34, a leaf spring 35 of proper selection, and the provision of hardened rollers and cams our mechanism will operate for millions of operations without wear and without any change in the operating point.

The surfaces of the cams 17 are circular so that once the leaf spring has flexed, any further angular movement of the cams will have no further effect on the distance between the bearing members 33 and 34.

The particular assembly shown provides 35° overtravel from the 10° operating point. Operation of the cams 17 in a clockwise direction, for the showing in Fig. 2, will provide 45° overtravel as the position of the rollers 31 and 32 is not changed.

In operation, the spring 21, which is subjected to stress by the movement of the arm 19 away from the position of stop 25, returns the parts to their neutral position as soon as the lever 11 is released by the actuating dog on the machine, and this is so regardless of the direction of rotation of shaft 15.

A novel feature of our invention is that the mechanisms may be adjusted for operation in either direction by merely removing the bolt 23 and rotating the stop mechanism 22 through 90° from the position shown in Fig. 2, to the position shown in Fig. 6. By doing this, it will be apparent that the rise in the cam surfaces are on opposite sides of the rollers 31 and 32. When the bolt 23 is replaced, the stops are again rigidly fixed. This change can be made without removing the cover 2 from the base 3 by removing the bolt 23 and then turning the operating lever 11 in the correct direction.

The operating arm 11 is secured to the shaft 15 by means of the split serrated bushing 10 held in place by the roll pin 36. This roll pin is an expandable dowel pin formed of sheet metal rolled into a hollow shape. The length of the dowel pin is just slightly less than the diameter of the bushing 10. When bolt 12 is tightened, the slot in the bushing permits it to hug the shaft and not rock.

While we have shown and described but a single embodiment of our invention, it will be apparent to those skilled in the art that modifications may be made all within the spirit of our invention. We, therefore, do not wish to be limited to the details of the showing made but only by the scope of the claims hereto appended.

We claim as our invention:

1. In an operating mechanism for a plunger actuated device, in combination, a base, a plunger actuated device having an axially movable plunger, a pair of bell-crank levers pivotally mounted on the base, bearing means on each of one pair of corresponding arms of the bell-crank levers, a flat spring clipped in bowed relation between the bearing means and the bearing means being so disposed that the middle convex portion of the spring is adjacent the plunger of the device to be operated by axial movement of the plunger, a shaft mounted for rotation in suitable bearings in the base, a cam secured to the shaft, said cam being disposed adjacent the ends of the other pair of corresponding arms of the bell-crank levers, and means for rotating the shaft to thus cause the cam to rotate each of the bell-crank levers through an equal fixed angle to thus move each of the bearing means toward each other an equal amount to bow the spring still more to cause the middle of the spring to actuate the plunger.

2. In a switch actuating mechanism for a switch having an actuating button, in combination, a base, a pair of bell-crank levers of substantially like configuration each having an actuator leg and an actuated leg, a rotary cam mounted on the base and disposed to engage the actuator legs, bearings on each of the actuated legs, a leaf spring clipped in bowed relation between the bearings with the bearings being so disposed that the middle of the spring is adjacent the button, and means for rotating the cam to cause the bearings to move a fixed equal distance in opposite directions to thus alter the distance between the bearings and thus alter the curvature of the bow in the spring and thus actuate the button without causing any wiping action on the button.

3. In operating apparatus for a plunger actuated device, the combination of, a housing, a shaft rotatably mounted in the housing, means mounting said plunger actuated device in said housing with the axis of said plunger aligned with the axis of said shaft, a leaf spring, a pair of bell-crank levers pivotally mounted in the housing, said bell-crank levers having a leaf-spring-receiving bearing at each of the ends of corresponding legs of the levers for loosely receiving the ends of said spring, said leaf spring under end thrust being clipped between the bearings to thus be bowed, said bell-crank levers being so disposed in the housing that the midpoint of the leaf spring is in the axis of the plunger and in close proximity to the plunger, a cam on the shaft disposed to actuate the other pair of corresponding legs of the bell-crank levers upon rotation of said shaft to effect movement of each of the bearings an equal amount toward the midpoint of the spring to thus bow the spring only a preselected fixed amount to thus actuate the plunger.

4. An actuating mechanism for a plunger operated device including, in combination, a housing for said plunger operated device, a flat leaf spring, a pair of movable bearings for non-rigidly receiving the respective ends of the spring, said spring being inserted under end thrust to thus be clipped in an initially bowed relation between the bearings and the disposition of the bearings is such that the midpoint of the spring is in the plunger axis of said plunger operated device and the convex side of the spring is in close proximity to the end of the plunger, and bearing actuating means for simultaneously moving the bearings an equal distance toward the plunger axis to bow the spring only a preselected fixed amount to thus axially move the plunger.

5. An actuating mechanism for a plunger operated device including, in combination, a housing for said plunger operated device, a flat leaf spring, a pair of movable bearings for non-rigidly receiving the respective ends of the spring, said spring being inserted under end thrust to thus be clipped in an initially bowed relation between the bearings and the disposition of the bearings is such that the midpoint of the spring is in the plunger axis of the plunger operated device and the convex side of the spring is in close proximity to the end of the plunger, bearing actuating means for simultaneously moving the bearings an equal distance toward the plunger axis to bow the spring still more to thus axially move the plunger, said bearing actuating means including a pair of bell-crank levers pivotally mounted in the housing, said bearings being mounted on two corresponding legs of the bell-crank lever, a shaft rotatably mounted in the housing, a cam mounted on the shaft and adapted to coact with the other two corresponding legs of the bell-crank levers upon rotation of said shaft to actuate the bell-crank levers to cause said bearings simultaneously to move toward each other an equal amount to give a controlled displacement of said spring.

6. An actuating mechanism for a plunger operated device including, in combination, a housing for said plunger operated device, a flat leaf spring, a pair of movable bearings for non-rigidly receiving the respective ends of the spring, said spring being inserted under end thrust to thus be clipped in an initially bowed relation between the bearings and the disposition of the bearings is such that the midpoint of the spring is in the plunger axis of the plunger operated device and the convex side of the spring is in close proximity to the end of the plunger, bearing actuating means for simultaneously moving the bearings an equal distance toward said plunger axis to bow the spring still more to thus axially move the plunger, said bearing actuating means including a pair of bell-crank levers pivotally mounted in the housing, said bearings being mounted on two corresponding legs of the bell-crank lever, a shaft rotatably mounted in the housing, a cam mounted on the shaft and disposed to spread the other corresponding legs of the bell-crank levers a given distance upon a rotary motion of the cam in a given direction through an angle greater than a given relatively small angle.

7. An actuating mechanism for a plunger operated device including, in combination, a housing for said plunger operated device, a flat leaf spring, a pair of movable bearings for non-rigidly receiving the respective ends of the spring, said spring being disposed in an initially bowed relation between the bearings and the disposition of the bearings is such that the midpoint of the spring is in the plunger axis of the plunger operated device and the convex side of the spring is in close proximity to the end of the plunger, bearing actuating means for simultaneously moving the bearings an equal distance toward the plunger axis to bow the spring still more to thus axially move the plunger, said bearing actuating means including a pair of bell-crank levers pivotally mounted in the housing, said bearings being mounted on two corresponding legs of the bell-crank lever, a shaft rotatably mounted in the housing, a cam mounted on the shaft having circular portions of one diameter disposed diametrically opposite each other extending over substantially a quarter of the cam circumference and having circular portions of a slightly greater diameter disposed diametrically opposite each other and extending over substantially a quarter of the cam circumference, disposed to spread the other corresponding legs of the bell-crank levers a given distance upon a rotary motion of the cam in a given direction through an angle greater than a given relatively small angle.

8. An actuating mechanism for a plunger operated device including, in combination, a housing for said plunger operated device, a flat leaf spring, a pair of movable bearings for non-rigidly receiving the respective ends of the spring, said spring being disposed in an initially bowed relation between the bearings and the disposition of the bearings is such that the midpoint of the spring is in the plunger axis of the plunger operated device and the convex side of the spring is in close proximity to the end of the plunger, bearing actuating means for simultaneously moving the bearings an equal distance toward the plunger axis to bow the spring still more to thus axially move the plunger, said bearing actuating means including a pair of bell-crank levers pivotally mounted in the housing, said bearings being mounted on two corresponding legs of the bell-crank levers, a shaft rotatably mounted in the housing, a cam mounted on the shaft having circular portions of one diameter disposed diametrically opposite each other extending over substantially a quarter of the cam circumference and having circular portions of a slightly greater diameter disposed diametrically opposite each other and extending over substantially a quarter of the cam circumference, disposed to spread the other corresponding legs of the bell-crank levers a given distance upon a rotary motion of the cam in a given direction through an angle greater than a given relatively small angle and means for angularly shifting the cam with reference to the said other corresponding legs of the bell-crank levers so that rotation of the cam in a reverse direction effects the same operation of the bell-crank levers.

References Cited in the file of this patent

UNITED STATES PATENTS

| | | |
|---|---|---|
| 1,680,428 | Mottlau | Aug. 14, 1928 |
| 1,709,681 | Mottlau | Apr. 16, 1929 |
| 2,689,482 | Doutt | Sept. 21, 1954 |

FOREIGN PATENTS

| | | |
|---|---|---|
| 623,556 | France | June 27, 1927 |